United States Patent [19]

LaManna

[11] 3,995,504
[45] Dec. 7, 1976

[54] SELECTIVELY BI-DIRECTIONAL TAPE FEED MECHANISM

[75] Inventor: Richard J. LaManna, Whippany, N.J.

[73] Assignee: The Singer Company, New York, N.Y.

[22] Filed: Feb. 18, 1975

[21] Appl. No.: 550,501

[52] U.S. Cl. .................................................. 74/143
[51] Int. Cl.² ........................................ F16H 27/02
[58] Field of Search .................... 74/112, 142, 143

[56] References Cited
UNITED STATES PATENTS

| | | | |
|---|---|---|---|
| 2,507,756 | 5/1950 | Boylan | 74/112 |
| 3,162,794 | 12/1964 | Whitaker | 74/112 |
| 3,818,773 | 6/1974 | Natori | 74/112 |

*Primary Examiner*—Benjamin W. Wyche
*Assistant Examiner*—Wesley S. Ratliff, Jr.
*Attorney, Agent, or Firm*—Charles R. Lewis; Edward L. Bell

[57] ABSTRACT

A mechanism for producing bi-directional step motion of a shaft from a uni-directional source of rotation suitable for use in paper tape handling equipment includes a rocker plate rotatably mounted on an output shaft for rotation relative thereto. The rocker plate is caused to oscillate about the output shaft between a first limit and a second limit by a reciprocating connecting rod coupled to the rocker plate. A pawl is rotatably mounted on a pin secured to the rocker plate for engagement with a drive wheel secured to the output shaft. A timing means, a control means, and a control electromagnet cooperate to cause the pawl to engage with, or disengage from, the drive wheel at the limits of oscillation to cause the drive wheel and the output shaft secured thereto to step.

12 Claims, 9 Drawing Figures

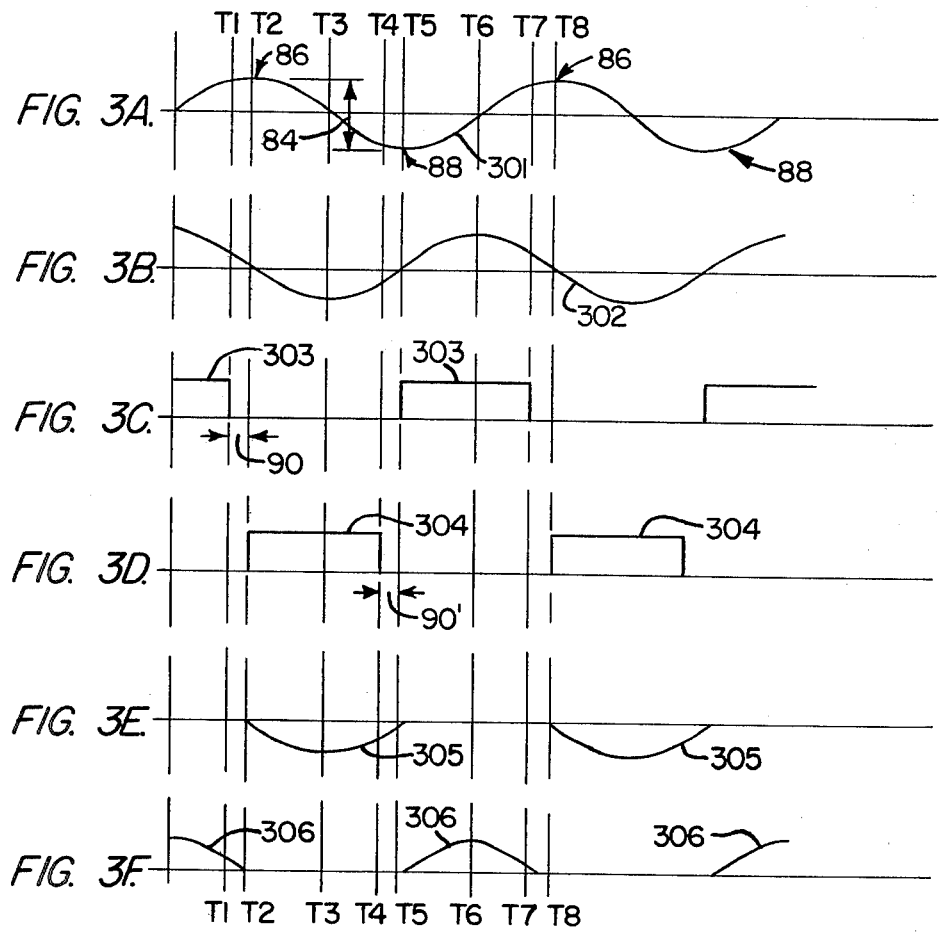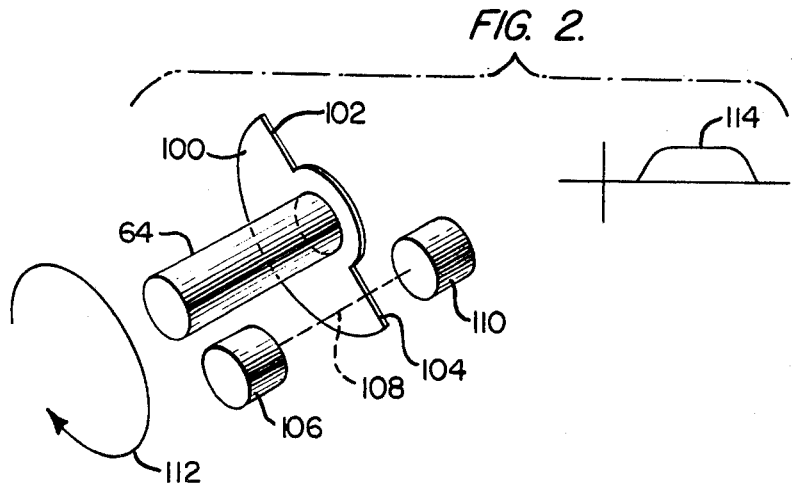

SELECTIVELY BI-DIRECTIONAL TAPE FEED MECHANISM

BACKGROUND OF THE INVENTION

1. Field of the Invention

The present invention relates to mechanisms for producing bi-directional step motion of a shaft from a continuously rotating uni-directional source and may be utilized in various devices such as paper tape punches and readers, card readers and punches, and the like.

2. Description of the Prior Art

Paper tape has been transported through paper tape handling equipment, such as readers and punches, by various transport mechanisms. In the prevalent paper tape handling system, the tape has a series of uniformly spaced perforations along the longitudinal axis. A sprocket wheel secured to a rotatable shaft is mounted adjacent one side of the tape. The sprocket wheel has a plurality of uniformly spaced pins extending from its periphery. A portion of the pins on the sprocket wheel engage the paper tape by extending through the perforations. The paper tape can then be transported by rotation of the shaft to which the sprocket wheel is secured. It is a requirement of most paper tape handling equipment that the tape be transported along the longitudinal axis in uniform increments. Such incremental transporting can be accomplished by incremental rotation of the shaft to which the sprocket wheel is secured. The incremental rotation is defined as a step. One of the common means to step the sprocket wheel shaft is to secure a rachet to the sprocket wheel shaft and actuate the rachet by means of an electromagnetically actuated pawl. As the rachet rotates, it causes the sprocket wheel to rotate thereby transporting the tape. A detent means, usually engaging the rachet, controls the magnitude of the angular displacement of the step by causing the rachet to cease rotating at selected positions of the rachet. While the pawl, rachet and detent have been satisfactory, they posses undesirable features relating to the acceleration and velocity profile of the paper tape as it is transported, and the uni-directional step limitation of the mechanisms. When the pawl in the prior art mechanisms is electromagnetically actuated, it abruptly impacts the rachet to initiate the step. The pawl is then pulled with increasing force by the electromagnet to cause the rachet to rapidly accelerate. At some point during the step, the detent means takes over control of the rachet from the pawl causing a discontinuity in the acceleration and velocity profile of the step. The detent means further accelerates the rachet until the detent means finds its locating position, at which point the rachet is abruptly decelerated to terminate the step motion. The non-uniform, discontinuous nature of the acceleration and velocity profile associated with the prior art pawl and rachet mechanisms can cause the tape to move out of engagement with the sprocket wheel, cause the tape engaging pins to tear the paper tape, and cause undesirable wear and fatigue of the parts.

Mechanisms are available which produce step rotation of the sprocket wheel shaft where the step has a uniform and continuous acceleration and velocity profile. Some of these mechanisms are also capable of providing step rotation in either direction. Such mechanisms, however, are characteristically complex, requiring expensive cams and other parts, and many require precise adjustments not compatible with economical equipment.

A relatively simple pawl and rachet mechanism which produces a step having a desirable acceleration and velocity profile is described in U.S. Pat. No. 3,058,362 issued to G. Perez. While the Perez mechanism overcomes the non-uniform and discontinuous acceleration and velocity limitations of the prior art pawl and rachet mechanisms, it only produces a uni-directional step and requires a clutch to interrupt an input rotation source.

The present invention overcomes the limitations of the prior art by providing a relatively simple, inexpensive tape transport mechanism which can produce step motion in either direction with the step motion having a desirable acceleration and velocity profile.

SUMMARY OF THE PRESENT INVENTION

In accordance with the present invention, a rocker plate is rotatably mounted on an output shaft for rotation relative thereto. The rocker plate is caused to oscillate about the output shaft between a first limit and a second limit by a reciprocating connecting rod coupled to the rocker plate. A pawl is rotatably mounted on a pin secured to the rocker plate and is engageable with a drive wheel secured to the output shaft. A timing means, a control means, and a control electromagnet mounted in magnetic proximity to the pawl cooperate to cause the pawl to (a) engage the drive wheel at the first limit and disengage the pawl from the drive wheel at the second limit to produce a step motion of the output shaft in a first direction, and (b) engage the drive wheel at the second limit disengage the pawl at the first limit to produce a step motion of the output shaft in a second direction, opposite that of the first direction. A detent wheel is resiliently biased against the drive wheel to maintain the drive wheel in an engaging alignment with the pawl at the first limit and the second limit.

BRIEF DESCRIPTION OF THE DRAWINGS

The present invention will be fully understood from consideration of the following detailed description taken in conjunction with the accompanying drawings, in which like reference characters refer to like parts in the several views, and wherein;

FIG. 2 is a perspective view of a timing means utilized by the present invention, FIG. 3A is an idealized graphical representation of the angular displacement (ordinate) with respect to time (abscissa) of a rocker plate, FIG. 3B is an idealized graphical representation of the angular velocity (ordinate) with respect to time (abscissa) of the rocker plate, FIG. 3C is an idealized graphical representation of current pulses (ordinate) with respect to time (abscissa) for a step in a first direction, FIG. 3D is an idealized graphical representation of current pulses (ordinate) with respect to time (abscissa) for a step in a second direction, opposite that of the first direction, FIG. 3E is an idealized graphical representation of the angular velocity (ordinate) with respect to time (abscissa) of an output shaft for a step in the first direction, FIG. 3F is an idealized graphical representation of the angular velocity (ordinate) with respect to time (abscissa) of the output shaft for a step in a second direction, opposite that of the first direction.

DESCRIPTION OF THE PREFERRED EMBODIMENT

Figure 1:
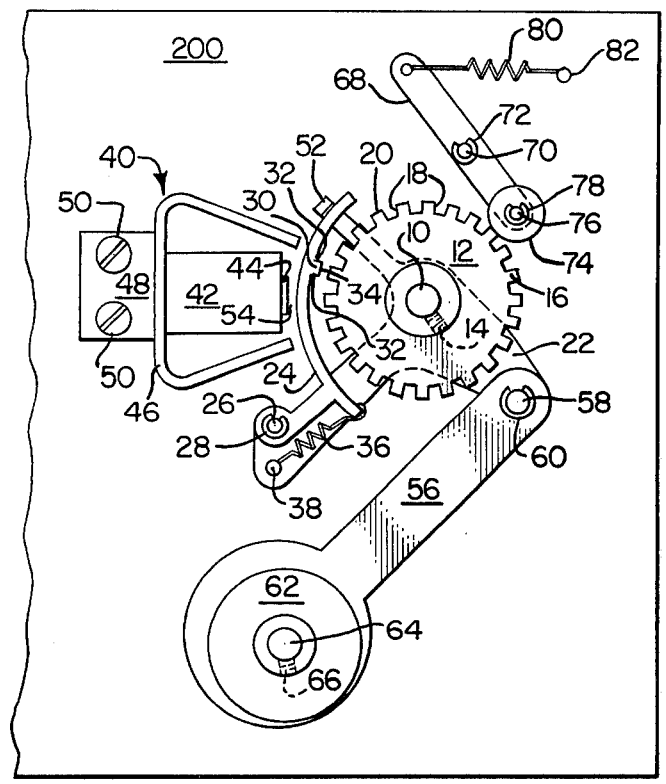
FIG. 1 is a plan view of a perferred embodiment utilizing the present invention.

As can be seen in FIG. 1, a preferred embodiment in accordance with the present invention includes an output shaft 10 rotatably mounted on a support means 200. The support means 200 may be a bearing plate which constitutes a part of a device, such as a paper tape punch or like device, which utilizes the present invention. A drive wheel 12 is secured to the output shaft 10 for rotation therewith by any suitable means such as a set screw 14. The drive wheel 12 includes a plurality of uniformly spaced teeth 16 extending radially outward from the periphery of the drive wheel 12. Each tooth 16 has sides 18 and a crest 20. The output shaft 10 is operably coupled to a driven device (not shown) which requires a selectively bi-directional step motion having a uniform velocity and acceleration profile. In the case where the preferred embodiment of the present invention is utilized with a paper tape punch (not shown) the output shaft 10 is operably coupled to a sprocket wheel (not shown) contained within the paper tape punch. The sprocket wheel has a plurality of radially extending pins which engage uniformly spaced perforations in the paper tape. A step is defined as a preselected angular displacement of a rotatable shaft. For example, a step of 10° would be the rotation of a shaft through an angle of 10°.

A rocker plate 22 is rotatably mounted on the output shaft 10 for rotation relative thereto and is partly restrained from axial movement along the output shaft 10 by the drive wheel 12 on one side and the support means 200 on the other side. The rocker plate 22 carries a pawl 24 rotatably mounted on a pin 26 secured substantially normal to the rocker plate 22. The pawl 24 is restrained from axial movement on the pin 26 by any suitable means such as a lock ring 28 situated in a recess (not shown) in the periphery of the pin 26. The pawl 24 includes a tooth 30 having sides 32 and a crest 34 engagable between two adjacent teeth 16 on the drive wheel 12. The pawl 24 is biased for engagement with the drive wheel 12 by a tension spring 36 secured to one end of the pawl 24 and to a pin 38 secured substantially normal to the rocker plate 22.

A control electromagnet 40, including a magnet coil 42, a magnet pole 44, and a magnet frame 46 is mounted on a bracket 48 secured to the support means 200 by any suitable means such as screws 50. The bracket 48 maintains the control electromagnet 40 in magnetic proximity to the pawl 24. The control electromagnet 40 is selectively energizable by a control means described below. When energized, the control electromagnet 40 exerts a magnetic force on the pawl 24 sufficient to overcome the biasing force of the spring 36 and pulls the pawl 24 against a back stop 52 which extends in a direction substantially normal to the rocker plate 22. When the pawl 24 is pulled against the back stop 52, it cannot engage the drive wheel 12. The control electromagnet 40 is so located that an air gap 54 exists between the magnet pole 44 and magnet frame 46, and the pawl 24 when the pawl 24 is pulled against the back stop 52 by the energized control electromagnet 40.

One end of a connecting rod 56 is rotatably mounted on a pin 58 secured substantially normal to the rocker plate 22. The connecting rod 56 is restrained from axial movement on the pin 58 by any suitable means such as a lock ring 60 situtated in a recess (not shown) in the periphery of the pin 58. The other end of the connecting rod 56 is rotatably mounted on an eccentric 62 for rotation relative thereto. The eccentric 62 is secured to a drive shaft 64 for rotation therewith by any suitable means such as a set screw 66. The drive shaft 64 is operably coupled to any unidirectional source of rotation including an electric motor (not shown).

A detent arm 68 is rotatably mounted intermediate the ends thereof on a pin 70 and is restrained from axial movement thereon by any suitable means such as lock ring 72 situated in a recess (not shown) on the periphery of the pin 70. The pin 70 is secured substantially normal to the support means 200. A detent wheel 74 is rotatably mounted on a shaft 76 secured substantially normal to one end of the detent arm 68 for rotation relative thereto. The detent wheel 74 is restrained from axial movement on the shaft 76 by any suitable means such as a lock ring 78 situated in a recess (not shown) in the periphery of the shaft 76. The detent wheel 74 is biased against the drive wheel 12 by a tension spring 80 secured between the other end of the detend arm 68 and a pin 82 secured substantially normal to the support means 200. The spring 80 urges a surface portion of the detent wheel 74 into the space between two adjacent teeth 16 of the drive wheel 12 to prevent any unintentional rotation of the drive wheel 12, and to control the alignment of the teeth 16 on the drive wheel 12 with respect to the tooth 30 on the pawl 24.

When the drive shaft 64 and the eccentric 62 secured thereto are rotated by the source of rotation (not shown) the connecting rod 56 is caused to reciprocate, thereby causing the rocker plate 22 to cyclicly oscillate about the output shaft 10. The period of each cycle is equal to the time required for one revolution of the source of rotation (not shown). The air gap 54 referred to hereinabove prevents mechanical wear between he magnet pole 44, the magnet frame 46, and the pawl 24. The oscillating motion of the rocker plate 22 over an exemplary period of time is graphically illustrated in FIG. 3A and FIG. 3B. The curve 301 in FIG. 3A illustrates two cycles of the angular displacement (ordinate) of the rocker plate 22 vs time (abscissa) and the curve 302 in FIG. 3B illustrates the two cycles of the angular velocity (ordinate) of the rocker plate 22 vs time (abscissa) associated with the angular displacement curve 301. As can be seen in FIG. 3A the oscillatory motion is sinusoidal. The vertical lines T1–T8 drawn through FIG. 3A and FIG. 3B as well as through FIGS. 3C, 3D, 3E, and 3F indicate points of interest discussed below. As best shown in FIG. 3A the rocker plate 22 oscillates through a predetermined angle 84 between a first limit 86 of rotation and a second limit 88 of rotation. The magnitude of the angle 84 depends upon the magnitude of the desired step, but must be less than 180°. If the angle 84 is greater than 180°, the rocker plate 22 will not oscillate about the output shaft 10, but will rotate continuously in one direction. When the rocker plate 22 is at the first limit 86 at the time T2, the angular velocity (FIG. 3B) of the rocker plate 22 is momentarily zero, and when the rocker plate 22 is at the second limit 88 at the time T5, the angular velocity of the rocker plate 22 is also momentarily zero. The detent wheel 74, as described hereinabove, controls the alignment of the teeth 16 on the drive wheel with respect to the tooth 30 on the pawl 24. This alignment is such that, when the rocker plate 22 is at either the first limit 86 or at the second limit 88 the tooth 30 on the pawl 24 is in an engaging relation with the teeth 16 on the drive wheel 12. That is, the pawl 24 can pivot on the pin 26 toward the stationary drive wheel 12 and the tooth 30 will fall between two adjacent teeth 16 on the drive wheel 12.

In order to produce a step of the output shaft 10 in a first rotary direction (as represented by the curve 305 in FIG. 3E), the pawl 24 is released from the influence of the control electromagnet 40 by de-energizing the control electromagnet 40 in accordance with the idealized current pulse curve 303 shown in FIG. 3C. For reasons discussed below, the pawl 24 is released at the time T1 when the rocker plate 22 is approaching the first limit 86. At the time T1 the angular velocity (FIG. 3B) of the rocker plate 22 is decreasing toward zero. When the pawl 24 is released at the time T1, the spring 36 causes the pawl 24 to rotate on the pin 26 toward the drive wheel 12. The pawl 24 continues to rotate until the crest 34 of the tooth 30 contacts the crest 20 of a tooth 16. The decelerating (FIG. 3B) rocker plate 22 moves the tooth 30 along the crest 20 of a tooth 16 and when the rocker plate 22 reaches the first limit 86 (at the time T2 when its angular velocity is substantially zero), the tooth 30 is urged by the spring 36 into the space between two adjacent teeth 16 of the drive wheel 12. The pawl 24 driven by the now accelerating (FIG. 3B) rocker plate 22 rotates the drive wheel 12 and the output shaft 10 secured thereto in the first rotary direction (curve 305 in FIG. 3E). When the rocker plate 22 reaches the second limit 88 (at the time T5), the control electromagnet 40 is energized by the control means described below in accordance with the idealized current pulse curve 303 in FIG. 3C. The pawl 24 is pulled out of engagement with the drive wheel 12 and against the back stop 52. The detent wheel 74 prevents movement of the drive wheel 12 when the pawl 24 is disengaged.

The motion imparted by the rocker plate 22 through the pawl 24 to the drive wheel 12 and the output shaft 10 secured thereto is illustrated by the curve 305 in FIG. 3E. The output shaft 10 begins its step motion at substantially zero velocity at the time T2, accelerates uniformly to a maximum velocity at the time T3 and then decelerates uniformly to terminate the step at substantially zero velocity at the time T5. None of the non-uniform, discontinuous acceleration and deceleration experienced with the prior art pawl and rachet mechanisms is encountered.

In the case where the output shaft 10 is operably coupled to the paper tape engaging sprocket wheel of a paper tape punch, the paper tape will begin its travel at substantially zero velocity, accelerate uniformly to a maximum velocity, and then decelerate uniformly to terminate its travel at substantially zero velocity. In that the motion imparted to the paper tape is uniformly controlled, the probability of the paper tape tearing or moving out of engagement with the sprocket wheel is minimized. Additionally, parts fatigue and wear are also minimized.

In order to produce a step in a second rotary direction (as represented by the curve 306 in FIG. 3F), opposite that of the first rotary direction, the pawl 24 is released from the influence of the control electromagnet 40 by de-energizing the control electromagnet 40 in accordance with the idealized current pulse curve 304 in FIG. 3D. For reasons discussed below, the pawl 24 is released at the time T4 when the rocker plate 22 is approaching the second limit 88. At the time T4 the angular velocity (FIG. 3D) of the rocker plate 22 is decreasing toward zero. When the pawl 24 is released at the time T4, the spring 36 causes the pawl 24 to rotate on the pin 26 toward the drive wheel 12. The pawl 24 continues to rotate until the crest 34 of the tooth 30 contacts the crest 20 of a tooth 16. The decelerating (FIG. 3B) rocker plate 22 moves the tooth 30 along the crest 20 of a tooth 16 and when the rocker plate 22 reaches the second limit 88 (at the time T5 when its angular velocity is substantially zero), the tooth 30 is urged by the spring 36 into the space between two adjacent teeth 16 of the drive wheel 12. The pawl 24 driven by a now accelerating (FIG. 3B) rocker plate 22 rotates the drive wheel 12 and the output shaft 10 secured thereto in the second rotary direction (curve 306 in FIG. 3F). When the rocker plate 22 reaches the first limit 86 (at the time T8) the control electromagnet 40 is energized by the control means described below in accordance with the idealized current pulse curve 304 in FIG. 3D. The pawl 24 is drawn out of engagement with the drive wheel 12 by the now energized (FIG. 3D) control electromagnet 40. The detent wheel 74 prevents movement of the drive wheel 12 when the pawl 24 is disengaged.

The motion imparted by the rocker plate 22 to the output shaft 10 through the pawl 24 and the drive wheel 12 is illustrated by the curve 306 in the FIG. 3F. As in the case of the step in a first direction discussed above, the output shaft 10 begins its step motion at substantially zero velocity, at the time T5, accelerates to a maximum velocity at the time T6 and then decelerates uniformly to terminate the step at substantially zero velocity at the time T8. In addition to the desirable acceleration and velocity profile produced by the present invention, step motion in either direction is available thereby overcoming the undesirable limitations of the prior art pawl and rachet mechanisms. In that the present invention is relatively simple and straight forward, requiring no expensive parts or precise adjustments, it is suitable for use in low cost equipment.

It is preferable not to de-energize the control electromagnet 40 at the limits 86 and 88. A finite pivoting time is required for the pawl 24 to pivot from its position contiguous to the back stop 52 to the drive wheel 12. The control electromagnet 40 may be de-energized in advance of the time the rocker plate 22 reaches it limits 86 and 88 to compensate for the finite pivoting time. More preferably, the control electromagnet 40 should be de-energized sufficiently far in advance of the limit 86 or 88 so that the pawl 24 is pivoted onto the crest 20 of a tooth 16. The tooth 30 then rides the crest 20 of a tooth 16 until the tooth 30 is urged into a space between two adjacent teeth 16 of the drive wheel 12 by the spring 36 at the limit 86 or 88. For a step in the first direction the advance release time period is equal to the difference between the time T1 and the time T2 as illustrated by the time interval 90 in FIG. 3C. For a step in the second direction the advance release time period is equal to the difference between the time T4 and the time T5 as illustrated by the time interval 90' in FIG. 3D.

A first timing means which is described in detail below is illustrated in FIG. 2. This first timing means is suitable for generating signals to cause the output shaft 10 to step in the first rotary direction (FIG. 3E). A second timing means which is not illustrated but which is identical in structure to the first timing means is required to generate signals to cause the output shaft 10 to step in the second rotary direction (FIG. 3F). Except for rotary alignment differences discussed below, a description of the structure of the first timing means is sufficient to encompass the structure of the unillustrated second timing means. The timing means includes a timing vane 100 secured to the drive shaft 64 for rotation therewith. The timing vane 100 is fabricated from an opaque material and has a partly circular shape with a first edge 102, and a second edge 104. A light emitting diode 106 is mounted by any suitable means adjacent one side of the timing vane 100 and projects a beam of light represented by the broken line 108 to a photosensitive transistor 110 mounted by any suitable means adjacent the other side of the timing vane 100. During a portion of the revolution of the drive shaft 64, the beam of light 108 transmitted from the light emitting diode 106 to the photosensitive transistor 110 will be interrupted by the opaque portion of the timing vane 100. Hereinafter, the term "transition" will be used to describe the point in time when one of the edges, 102 or 104, (called the leading edge) cuts through and interrupts the light beam 108, and the point in time when the other edge, 102 or 104 (called the trailing edge) allows the light beam 108 to be transmitted to the photosensitive transistor 110. Assuming that the drive shaft 64 as illustrated in FIG. 2 is rotating in a direction shown by the arrow 112, the edge 102 is the leading edge and the edge 104 is the trailing edge. A transition occurs when the leading edge 102 cuts through and interrupts the light beam 108, and when the trailing edge 104 allows the light beam 108 to be transmitted to the photosensitive transistor 110. The timing vane 100 is rotatably aligned on the drive shaft 64 and is so configured that the leading transition coincides with the time when the control electromagnet 40 must be de-energized (e.g., time T1 in FIG. 3C) and the trailing transition coincides with the time when the control electromagnet 40 must be energized (e.g., time T5 in FIG. 3C). The photosensitive transistor 110 produces one output pulse 114 per revolution of the drive shaft 64. The rise slope represents the leading transition and the falling slope represents the trailing transition.

Figure 4:
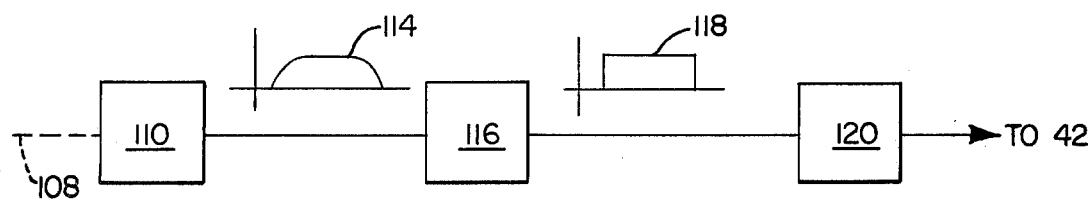
FIG. 4 is a block diagram of a control means utilized by the preferred embodiment of the present invention.

Referring to the control means illustrated in FIG. 4, the pulse 114 is coupled to a Schmitt trigger 116 which delivers a rectangular pulse 118 having a fast rise and a fast fall time. The Schmitt trigger 116 assists in discriminating between the input pulse 114 and any noise that may be caused by changes in optical characteristics of the edges 102, 104. Such noise may be caused by the accumulation of dust on each edge 102, 104. The output of the Schmitt trigger 116 is coupled to the input of an amplifier 120. The output of the amplifier 120 is operably coupled to the control electromagnet 42. The control electromagnet in response to the output of the amplifier 120 generates a magnetic field which in turn controls the movement of the pawl 24 in accordance with the description above.

The first timing means just described is suitable for generating signals to cause the output shaft 10 to step in a first rotary direction. In order to cause the output shaft 10 to step in a second rotary direction (FIG. 3F), a second timing means (not shown), identical in structure to the first timing means described above, is secured to the drive shaft 64. The second timing vane is rotatably aligned on the drive shaft 64 such that the leading transition occurs at the time when the control electromagnet 40 must be de-energized (e.g., the time T4 in FIG. 3D) and the trailing transition coincides with the time when the control electromagnet must be energized (e.g., the time T8 in FIG. 3D).

As will be apparent to those skilled in the art, various changes and modifications may be made to the preferred embodiment described without departing from the scope of the present invention as defined by the appended claims.

What is claimed is:
1. A mechanism for producing step motion in either direction comprising:
   a rotatable output shaft having an axis of rotation;
   a drive wheel secured to the shaft;
   a rotatable rocker plate having an axis of rotation in an alignment with the axis of rotation of the shaft;
   means to continuously oscillate the plate between a first limit and a second limit;
   the means to oscillate the plate imparting a periodic velocity profile to the plate;
   a pawl mounted on the plate engagable with the wheel when the plate is at a velocity close to and including zero velocity and adapted to drive the wheel in either a first direction or a second direction; and
   a control means to selectively cause the pawl to engage the drive wheel and disengage the drive wheel.
2. The mechanism claimed in claim 1, wherein the plate is rotatably mounted on the shaft.
3. The mechanism in claim 2, wherein the control means causes the pawl to engage the drive wheel at the first limit and disengage the drive wheel at the second limit to cause the shaft to step in a first direction.
4. The mechanism claimed in claim 3, wherein the control means causes the pawl to engage the drive wheel at the second limit and disengage the drive wheel at the first limit to cause the shaft to step in a second direction, opposite that of the first direction.
5. The mechanism claimed in claim 4, wherein the means to oscillate the plate comprises:
   a drive shaft coupled to a source of rotation;
   an eccentric secured to the drive shaft; and
   a connecting rod of which one end is rotatably mounted on the eccentric and the other end is coupled to the plate;
   whereby rotation of the drive shaft causes the eccentric to reciprocate the connecting rod which causes the plate to oscillate between the first limit and the second limit.
6. The mechanism claimed in claim 5, further comprising:
   a detent means mounted in cooperating relation with the drive wheel whereby the detent means maintains the drive wheel in an engaging relation with the pawl at the first limit and the second limit.
7. The mechanism claimed in claim 5, wherein the control means is responsive to the angular position of the drive shaft.
8. The mechanism claimed in claim 7, wherein the control means further comprises:
   a timing means responsive to the angular position of the drive shaft.
9. The mechanism claimed in claim 8, wherein the timing means further comprises:
   a timing vane secured to the drive shaft;

a light emitting means mounted adjacent one side of the timing vane; and a light responsive means mounted adjacent the other side of the timing vane in a light receiving registration with the light emitting means, whereby rotation of the drive shaft causes the timing vane to periodically interrupt the light emitted from the light emitting means and received by the light responsive means.

10. The mechanism claimed in claim 9, wherein the control means further comprises:

a control electromagnet mounted in a magnetic proximity to the pawl; and electronic means coupling the light responsive means with the control electromagnet.

11. The mechanism claimed in claim 4, wherein the drive wheel further comprises:

a plurality of uniformly spaced teeth extending radially outward from the periphery of the drive wheel.

12. The mechanism claimed in claim 2, wherein the axis of rotation of the output shaft is coincident with the axis of rotation of the plate.

* * * * *